United States Patent
Longfield et al.

(10) Patent No.: US 9,316,076 B2
(45) Date of Patent: Apr. 19, 2016

(54) HIGH PRESSURE HIGH TEMPERATURE (HPHT) WELL TOOL CONTROL SYSTEM AND METHOD

(75) Inventors: Colin Longfield, Paris (FR); Wei Wang, Sugar Land, TX (US); David Merlau, Friendswood, TX (US); Brad Bailey, Katy, TX (US); Sebastien Ives, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 976 days.

(21) Appl. No.: 13/336,032

(22) Filed: Dec. 23, 2011

(65) Prior Publication Data

US 2012/0168146 A1 Jul. 5, 2012

Related U.S. Application Data

(60) Provisional application No. 61/427,402, filed on Dec. 27, 2010.

(51) Int. Cl.

| | | |
|---|---|---|
| E21B 21/10 | (2006.01) | |
| E21B 23/04 | (2006.01) | |
| E21B 34/06 | (2006.01) | |
| E21B 34/10 | (2006.01) | |
| E21B 34/16 | (2006.01) | |
| E21B 41/00 | (2006.01) | |
| E21B 47/18 | (2012.01) | |
| H01F 7/16 | (2006.01) | |
| F16K 31/06 | (2006.01) | |
| E21B 34/00 | (2006.01) | |

(52) U.S. Cl.
CPC .......... *E21B 23/04* (2013.01); *E21B 34/06* (2013.01); *E21B 34/10* (2013.01); *E21B 34/16* (2013.01); *E21B 41/00* (2013.01); *E21B 47/18* (2013.01); *F16K 31/0665* (2013.01); *H01F 7/1607* (2013.01); *E21B 2034/002* (2013.01); *Y10T 29/4902* (2015.01); *Y10T 29/49407* (2015.01)

(58) Field of Classification Search
USPC ............... 251/86, 88, 129.14, 363, 360, 102; 137/550, 315.03
See application file for complete search history.

(56) References Cited

U.S. PATENT DOCUMENTS

| | | | | |
|---|---|---|---|---|
| 2,288,938 A | * | 7/1942 | Claytor | 335/261 |
| 2,702,089 A | * | 2/1955 | Engelder | 96/118 |

(Continued)

FOREIGN PATENT DOCUMENTS

| | | |
|---|---|---|
| DE | 2052307 | 5/1972 |
| DE | 2208183 | 8/1973 |
| EP | 1357322 | 10/2003 |
| EP | 2018910 | 1/2009 |

OTHER PUBLICATIONS

International Search Report and Written Opinion for the equivalent PCT patent application No. PCT/US2011/067320 issued on May 7, 2013.

*Primary Examiner* — Cathleen Hutchins
*Assistant Examiner* — Ronald Runyan
(74) *Attorney, Agent, or Firm* — Cameron R. Sneddon

(57) ABSTRACT

Methods and apparatus are disclosed. The problems of damage and failure of solenoid valves in high pressure high temperature environments and the problem of difficult repair of solenoid valves are addressed through reduction of the possibility of damage to the ball seat and/or seals and through a modular design to increase the ease of repair and adjustment in the event repair is needed.

15 Claims, 7 Drawing Sheets

(56) References Cited

U.S. PATENT DOCUMENTS

| | | | |
|---|---|---|---|
| 3,107,893 A * | 10/1963 | Bashe | 251/86 |
| 4,186,883 A * | 2/1980 | Robling | 239/491 |
| 4,246,002 A * | 1/1981 | Bell | 48/192 |
| 4,768,555 A | 9/1988 | Abel | |
| 4,796,699 A * | 1/1989 | Upchurch | |
| 5,556,175 A * | 9/1996 | Hayakawa et al. | 303/119.2 |
| 5,836,350 A * | 11/1998 | Sakaguchi et al. | 137/550 |
| 7,740,225 B1 * | 6/2010 | Estelle | 251/129.05 |

\* cited by examiner

HIGH PRESSURE HIGH TEMPERATURE (HPHT) WELL TOOL CONTROL SYSTEM AND METHOD

CROSS-REFERENCE TO RELATED APPLICATIONS

The present patent application claims priority to the provisional patent application identified by U.S. Ser. No. 61/427,402 titled "HIGH PRESSURE HIGH TEMPERATURE (HPHT) WELL TOOL CONTROL SYSTEM AND METHOD" filed on Dec. 27, 2010, the entire content of which is hereby incorporated by reference.

FIELD OF THE DISCLOSURE

The present disclosure relates generally to methods and apparatus for controlling the operation of downhole well tools from the surface, and particularly to a new and improved downhole tool control system adapted for operation in harsh environments, such as high pressure and high temperature.

BACKGROUND

It has become commercially prudent to perform well service operations, such as formation testing and evaluation, in very deep wells using pressure controlled valve devices such as those taught by Upchurch in U.S. Pat. No. 4,796,699, entitled "Well Tool Control System and Method," assigned to the assignee of this invention, the disclosure of which is hereby incorporated by reference into the specification of this application.

In U.S. Pat. No. 4,796,699 (hereinafter referred to as "Upchurch"), a well testing tool is disclosed which is not totally mechanical in nature. The tool includes a microelectronics package and a set of solenoid valves responsive to the microelectronics package for opening or closing a valve disposed in the tool. However, the well testing tool of Upchurch is susceptible to damage in extreme, harsh conditions.

For instance, debris or wear over time may damage the ball seats in the solenoid valves, causing leakage. Leakage may result in failure of the well testing tool, resulting in expensive and time consuming repair of the solenoid valves. Current solenoid valves require disassembly of the entire apparatus to redress the ball seat and replace multiple seals. Additionally, current solenoid valve seals are typically located both externally to the solenoid valve and internally in the solenoid valve and are difficult to repair and/or replace. Further, the complexity of disassembly and reassembly of the current solenoid valves may lead to misassembly errors. Misassembly errors include not properly aligning the solenoid valve at reassembly, cut or damaged seals, introduction of debris, and other errors well known in the art. These errors can lead to binding, leaking, and failure of the solenoid valve.

It is therefore desirable to provide a well tool control system and method for performing well service operations capable of withstanding harsh conditions, such as debris, high pressure and high temperature, and with ease of re-assembly in the event of wear or failure.

SUMMARY

Methods and apparatus are disclosed. The problems of damage and failure of solenoid valves in high pressure high temperature environments and the problem of difficult repair of solenoid valves are addressed through reduction of the possibility of damage to the ball seat and/or seals and through a modular design to increase the ease of repair and adjustment in the event repair is needed.

According to an aspect of the present disclosure, one or more embodiments relate to a solenoid valve used in a well control tool to permit actuation of the well control tool. Other aspects of the present disclosure include certain novel features of the solenoid valve design, including packaging, mounting, and filtering.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and not every component may be labeled in every drawing. In the drawings.

DETAILED DESCRIPTION

The following detailed description refers to the accompanying drawings. The same reference numbers in different drawings may identify the same or similar elements.

The mechanisms proposed in this disclosure overcome and/or circumvent the problems described above. The present disclosure describes one or more embodiments related to a solenoid valve used in a well control tool to permit actuation of the well control tool. Other aspects of the present disclosure include certain novel features of the solenoid valve design, including packaging, mounting, and filtering.

Specific embodiments of the present disclosure will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
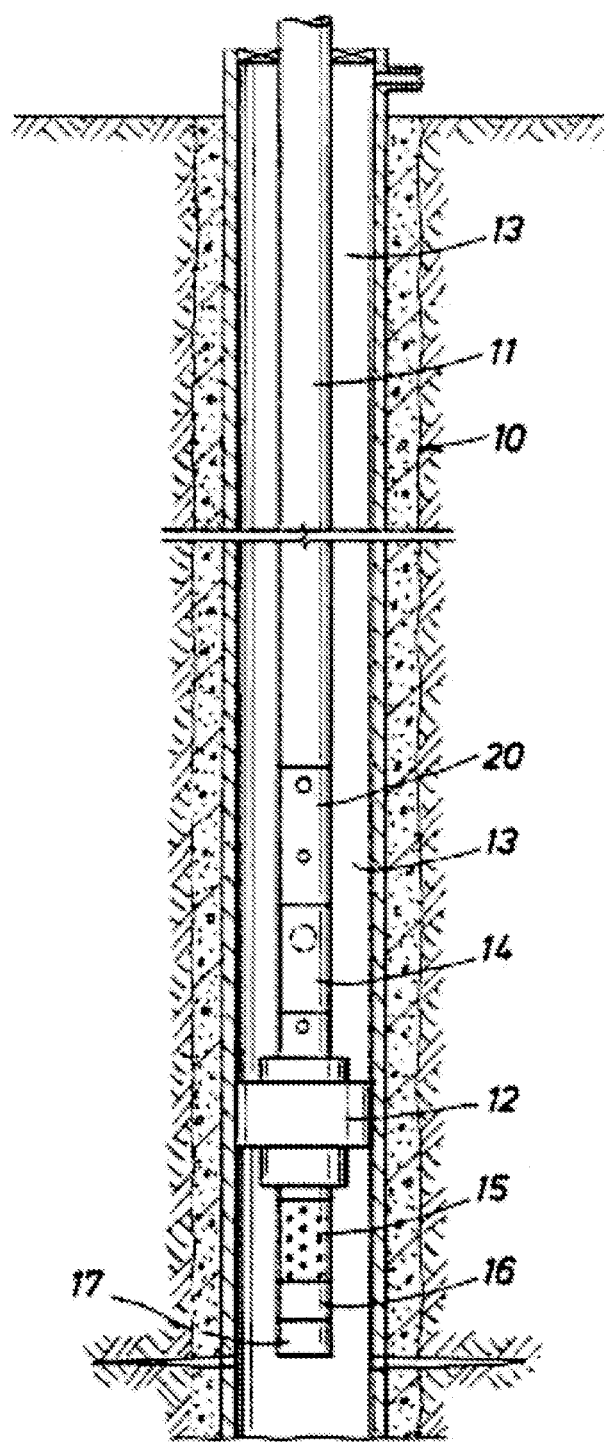
FIG. 1 depicts a schematic view of a string of drill stem testing tools positioned in a well being tested.

Referring initially to FIG. 1, a string of drill stem testing tools is shown suspended in a wellbore 10 on drill pipe or tubing 11, also known as a pipe string. The testing tools comprise a typical packer 12 that acts to isolate the well interval being tested from the hydrostatic head of fluids standing in the annulus 13 space thereabove, and a main test valve assembly 14 that serves to permit or to prevent the flow of formation fluids from the isolated interval into the pipe string 11. The main test valve assembly 14 is closed while the tools are being lowered, so that the interior of the tubing provides a low pressure region into which formation fluids can flow. After the packer 12 is set, the test valve assembly 14 is opened for a relatively short flow period of time during which pressure in the well bore is reduced. Then the test valve assembly 14 is closed for a longer flow period of time during which pressure build-up in the shut-in well bore is recorded. Other equipment components such as a jar and a safety joint can be coupled between the test valve assembly 14 and the packer 12, but are not illustrated in the drawing because they are notoriously well known. A perforated tail pipe 15 is connected to the lower end of the mandrel of the packer 12 to enable fluids in the well bore to enter the tool string, and typical inside and outside pressure recorders 16, 17 are provided for the acquisition of pressure data as the test proceeds. A circulating valve 20 is connected in the tool string above the main test valve assembly 14.

Figure 2:
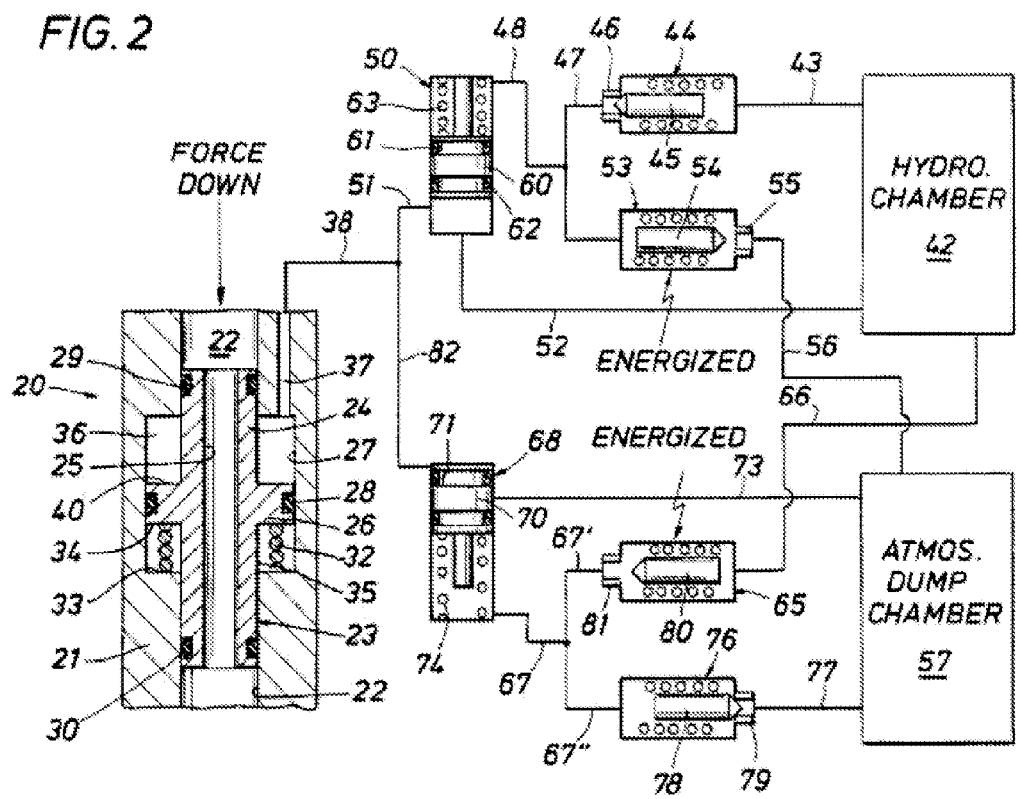
FIG. 2 depicts a schematic view of hydraulic components in accordance with one or more embodiments of the present disclosure.

As depicted schematically in FIG. 2, the circulating valve 20, previously identified in FIG. 1, includes an elongated tubular housing 21 having a passage 22. A valve actuator 23 is slideably mounted in the housing 21, and includes a mandrel 24 having a central passage 25 and an outwardly directed annular piston 26 that is sealed by a seal ring 28 with respect to a cylinder 27 in the housing 21. Additional seal rings 29, 30 are used to prevent leakage between the cylinder 27 and the passage 22. The seal rings 29, 30 preferably engage on the same diameter so that the mandrel 24 is balanced with respect to fluid pressures within the passage 22. A coil spring 32 located in the housing below the piston 26 reacts between an upwardly facing surface 33 at the lower end of the cylinder 27 and a downwardly facing surface 34 of the piston 26. The coil spring 32 provides upward force tending to shift the mandrel 24 upwardly relative to the housing 21. The annular area 35 in which the coil spring 32 is positioned contains air at atmospheric or other low pressure.

The cylinder area 36 above the piston 26 is communicated by a port 37 to a hydraulic line 38 through which oil or other hydraulic fluid is supplied under pressure. A sufficient pressure acting on the upper face 40 of the piston 26 will cause the mandrel 24 to shift downward against the resistance afforded by the coil spring 32, and a release of such pressure will enable the spring to shift the mandrel upward to its initial position. The reciprocating movement of the mandrel 24 is employed, as will be described subsequently, to actuate any one of a number of different types of valve elements which control the flow of fluids either through the passage 22 of the housing 21, or through one or more side ports through the walls of the housing 21.

The source of hydraulic fluid under pressure is a high pressure chamber 42 that is filled with hydraulic oil. The high pressure chamber 42 is pressurized by the hydrostatic pressure of well fluids in the well annulus 13 acting on a floating piston which transmits such pressure to the oil. A line 43 from the high pressure chamber 42 leads to a first solenoid valve 44 which has a spring loaded, normally closed valve element 45 that engages a seat 46. Another line 47 leads from the seat 46 to a line 48 which communicates with a first pilot valve 50 that functions to control communication between a hydraulic line 51 that connects with the actuator line 38 and a line 52 that also leads from the high pressure chamber 42. A second solenoid valve 53 which also includes a spring loaded, normally closed valve element 54 engageable with a seat 55 is located in a line 56 that communicates between the lines 47, 48 and a dump chamber 57 that initially is empty of liquids, and thus contains air at atmosphere or other low pressure.

The hydraulic system as shown in FIG. 2 also includes a third, normally closed solenoid valve 65 located in a line 66 that extends from the high pressure chamber 42 to a line 67 which communicates with the pressure side of a second pilot valve 68. The pilot valve 68 also includes a shuttle 70 that carries seal rings 71, 72 and which is urged toward its closed position by a coil spring 74, where the shuttle closes an exhaust line 73 that leads to the dump chamber 57. A fourth, normally closed solenoid valve 76 is located in a line 77 which communicates between the pressure line 67 of the pilot valve 68 and the dump chamber 57. The solenoid valve 76 includes a spring biased valve element 78 that coacts with a seat 79 to prevent flow toward the dump chamber 57 via the line 77 in the closed position. In like manner, the third solenoid valve 65 includes a spring-loaded, normally closed valve element 80 that coacts with a seat 81 to prevent flow of oil from the high pressure chamber 42 via the line 66 to the pilot input line 67 except when opened, as shown, by electric current supplied to its coil. When the solenoid valve 65 is open, oil under pressure supplied to the input side of the pilot valve 68 causes the shuttle 70 to close off the exhaust line 73. Although high pressure also may be present in the line 82 which communicates the outer end of the shuttle 70 with the lines 51 and 38, the pressures in lines 67 and 82 are equal, whereby the spring 74 maintains the shuttle closed across the line 73. Although functionally separate pilot valves have been shown, it will be recognized that a single three-way pilot valve could be used.

Figure 3:
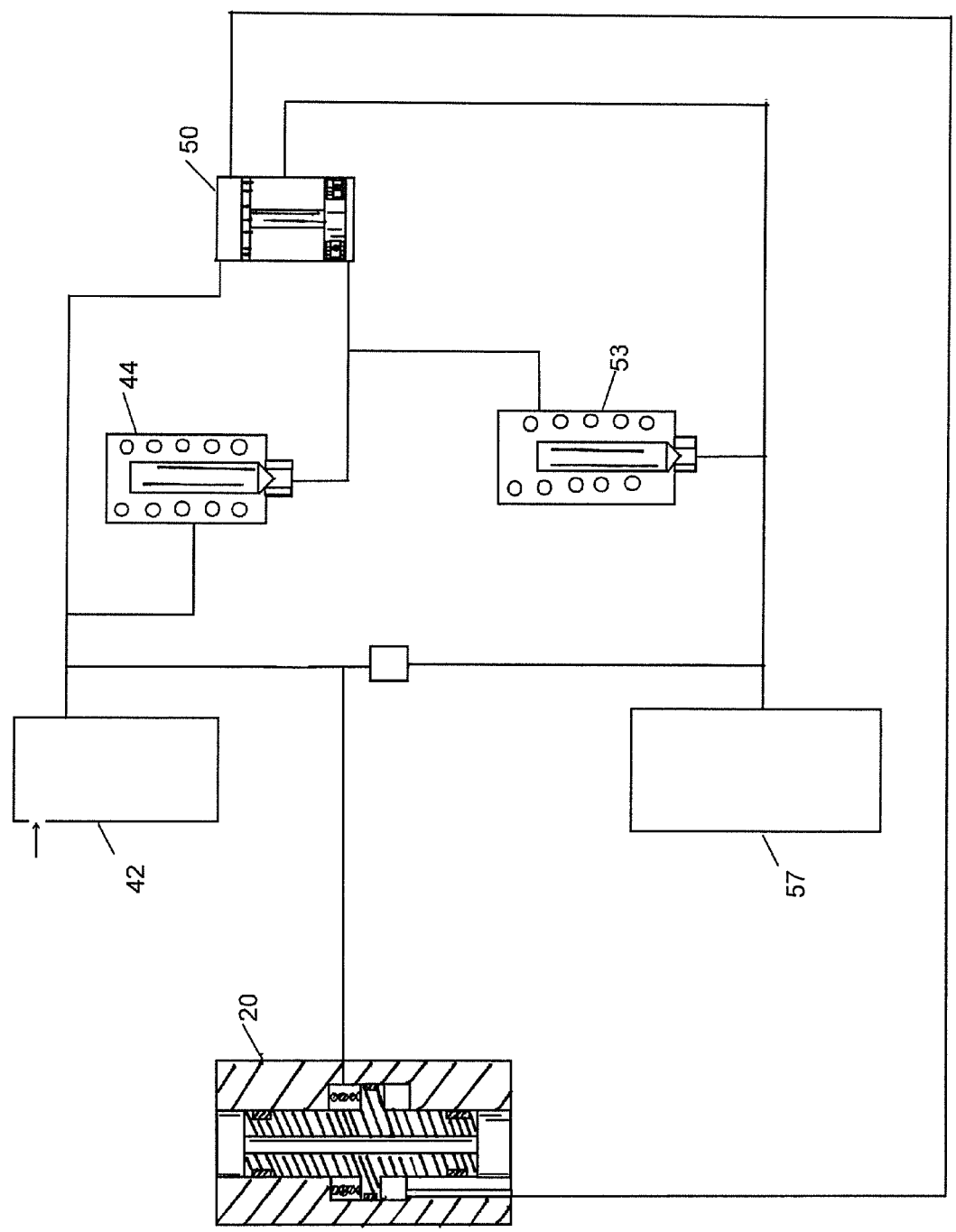
FIG. 3 depicts a schematic view of an alternative configuration of hydraulic components in accordance with one or more embodiments of the present disclosure.

FIG. 3 is another schematic depiction of an exemplary operation of solenoid valves in a downhole test tool. The set of solenoid valves 44 and 53 embodied in the well tool are energized by a microcontroller (not shown) also embodied in the well tool, which microcontroller is responsive to an output signal from any type of sensor, such as a pressure transducer embodied in the tool that further responds to changes in downhole pressure created and initiated by an operator at the well surface. It is understood that the sensor may be responsive to other stimuli than downhole pressure. Such microcontrollers and sensor systems are well known in the art and, as such, will not be further explained.

The solenoid valves 44 and 53, when energized in a first predetermined manner, open and close a set of pilot valves 50 that permit a hydraulic fluid under pressure, stored in a high pressure chamber 42, to flow to another section of the tool housing where an axially movable mandrel 24 is positioned. The fluid moves the mandrel 24 from a first position to a second position thereby opening another valve 20 in the tool (for example, a test valve or a reversing valve). When the set of solenoid valves 44 and 53 are energized in a second predetermined manner, the hydraulic fluid, stored in the other section of the tool housing, where the movable mandrel 24 is positioned, is allowed to drain from the housing to a separate dump chamber 57; as a result, the mandrel moves from the second position to the first position, thereby closing the other valve 20. In each case, the solenoid valves 44 and 53 are responsive to an output signal from the microcontroller, which is, in turn, responsive to an output signal from the sensor, which is, in turn, responsive to changes in other input stimuli, such as changes in pressure in the well annulus. The change in input stimuli is created and initiated, each time, by the operator at the well surface. Therefore, an opening or closing of the other valve(s) in the tool is responsive, each time, to a stimulus change signal (such as changes in downhole pressure) transmitted into the borehole by the operator at the well surface. FIG. 3 depicts a schematic of a well testing tool which includes one well tool control system for controlling the closure state of one valve.

Figure 4:
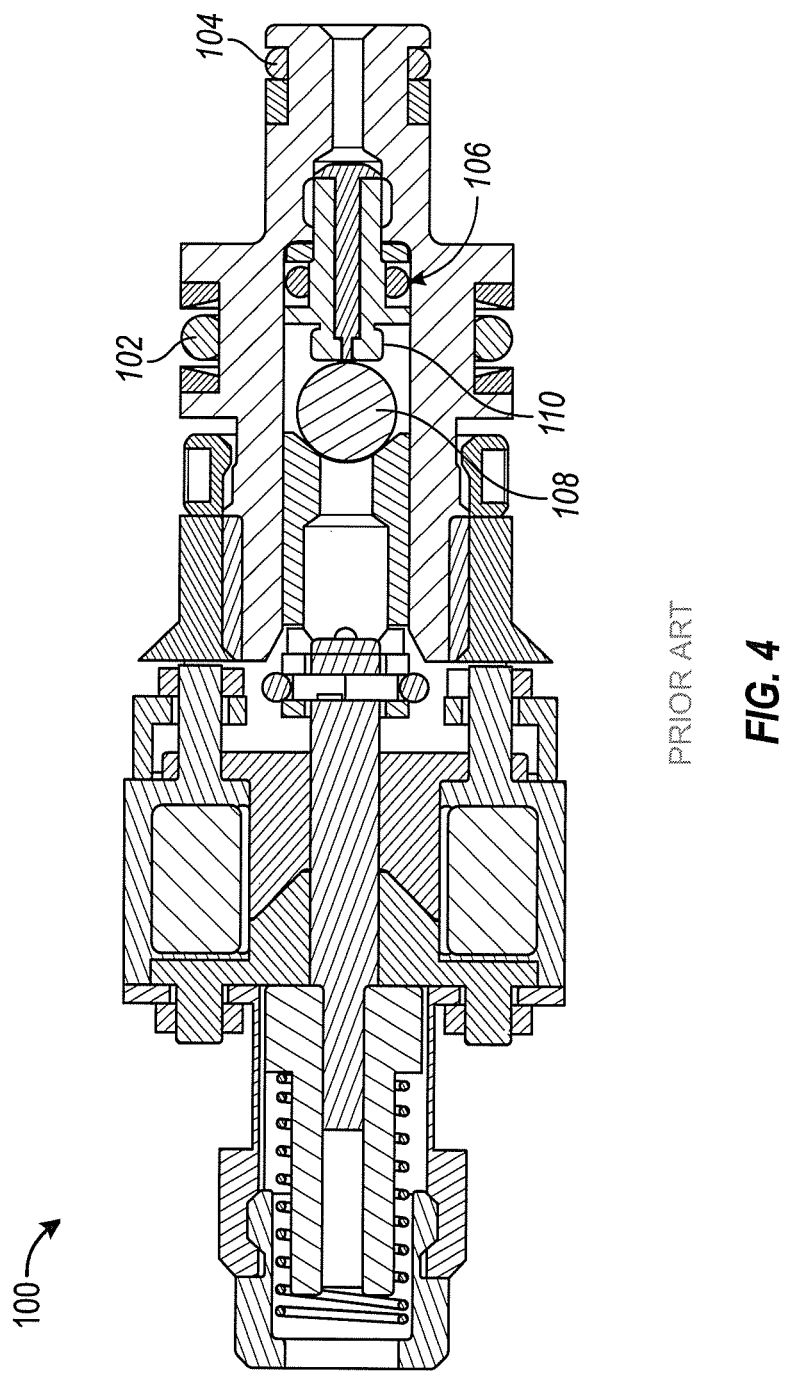
FIG. 4 depicts an exemplary solenoid valve as known in prior art.

FIG. 4 illustrates an example of a prior art solenoid valve 100. The prior art solenoid valve 100 contains two seals, 102 and 104, external to the prior art solenoid valve 100, and one seal 106 internal to the prior art solenoid valve 100. In the prior art, if the prior art solenoid valve 100 is disassembled for repair, all three seals 102, 104, and 106 may require redress. Each seal replacement carries a risk of misassembly that may cause leakage. Further, of these seals, the internal seal 106, depicted in FIG. 4 as an O-ring, is deeply inside the prior art solenoid valve 100. Redressing the internal seal 106 requires dissembling the prior art solenoid valve 100 assembly.

Additionally, the prior art solenoid valve 100 has no filtered flow path to control debris. Since the prior art solenoid valve 100 uses a seal comprised of the mating of a ball 108 to a metal seat 110, the sealing quality is very sensitive to debris. Once debris is introduced into the system, the metal seat 110 of the seal may be damaged by even small amounts of the debris. Once the seat 110 is damaged, the ball-to-seat seal is compromised and leakage may occur. Leakage may then result in the ultimate failure of the prior art solenoid valve 100. If the prior art solenoid valve 100 fails, the tool must be pulled from the well so that the prior art solenoid valve 100 may be replaced or repaired, an expensive and time consuming process.

To repair the prior art solenoid valve 100 ball-to-seat seal, the prior art solenoid valve 100 is entirely disassembled to reach the metal seat 110. The metal seat 110 is then repaired or replaced and the prior art solenoid valve 100 is completely reassembled. This reassembly also carries a risk of misalignment, which may cause binding or leakage in the reassembled prior art solenoid valve 100.

Additionally, since the metal seat 110 is contained in a component within the prior art solenoid valve 100 assembly, tightly held tolerances of the components are required in order to obtain the ball-to-seat relationship needed for a seal.

When the prior art solenoid valve 100 is mounted in the well tool, space is needed on the well tool to store the solenoid wire. Then a wire cap is needed to seal off this cavity. Due to limited space on the well tool, traditionally this wire cap used a face seal which tends to leak when conducting surface pressure testing.

Figure 5:
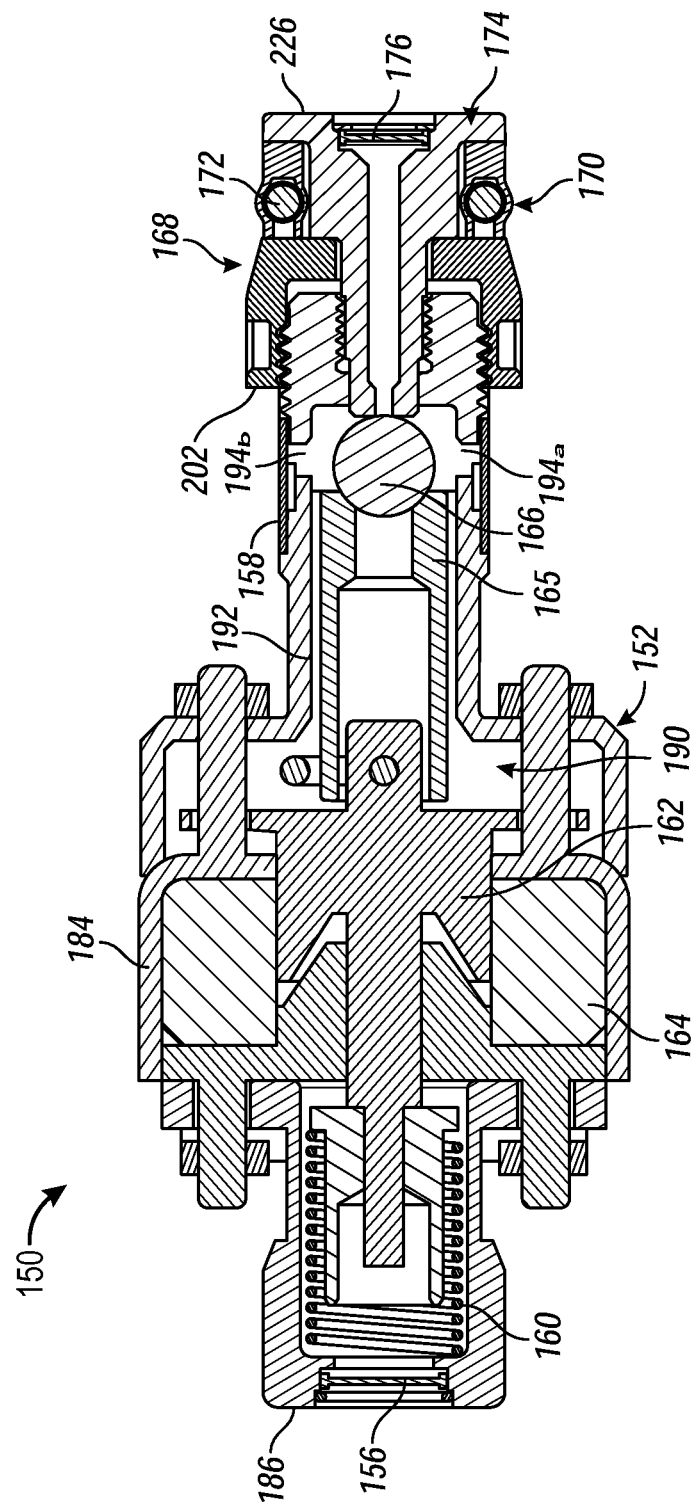
FIG. 5 depicts an improved solenoid valve in accordance with one or more embodiments of the present disclosure.

FIG. 5 is an illustration of one embodiment of this disclosure in which a solenoid valve assembly 150 is depicted. The workings of solenoid valves are well known in the art and will not be discussed in depth.

The solenoid valve assembly 150, in general, is provided with a solenoid housing 152, a ground spring 154, a first end filter 156, a port filter 158, a spring 160, a plunger 162, an electromagnetic solenoid coil 164, a ball 166, a lock nut 168, a seal member 170, a seal 172, a ball seat member 174, and a ball seat member filter 176.

The solenoid housing 152 may have an outer wall 184, a first end 186, a second end 188, and a solenoid housing bore 190, the solenoid housing bore 190 being generally longitudinal extending along an axis through the first end 186 and the second end 188. The solenoid housing bore 190 creates an inner wall 192 of the solenoid housing 152, and the solenoid housing 152 may also have at least one port 194 connecting to the solenoid housing bore 190 through the solenoid housing 152.

Figure 7:
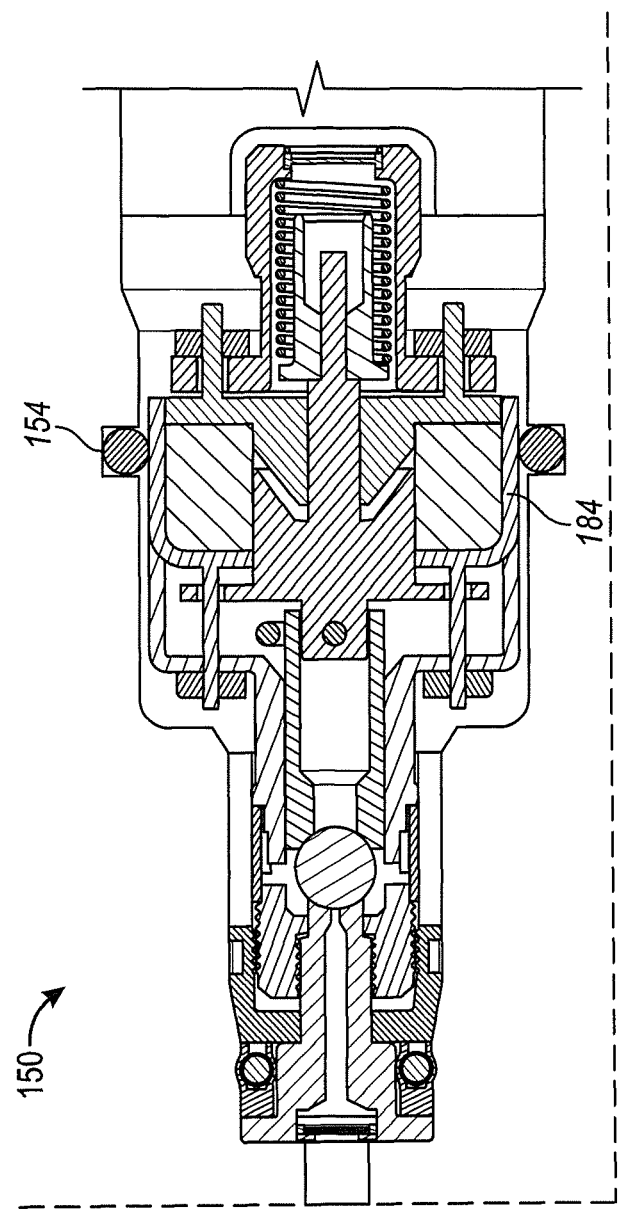
FIG. 7 depicts packaging of an improved solenoid valve in accordance with one or more embodiments of the present disclosure.

The ground spring 154 may be disposed around the outer wall 184 of the solenoid housing 152. In this example, the ground spring 154 is in contact with the outer wall 184 of the solenoid housing 152, as shown in FIG. 7.

The first end filter 156 may be disposed in the solenoid housing bore 190 at the first end 186 of the solenoid housing 152. The port filter 158 may be disposed in the port 194, or outside of the port 194. The spring 160 may be disposed in the solenoid housing bore 190 between the first end filter 156 and the second end 188 of the solenoid housing 152.

The plunger 162 may be disposed in the solenoid housing bore 190 between the spring 160 and the second end 188. However, the plunger 162 may also be described as between the first end 186 and the second end 188 of the solenoid housing 152.

The electromagnetic solenoid coil 164 acts upon the plunger 162, and may be disposed at least in part around the plunger 162. The ball 166 is disposed in the solenoid housing bore 190 between the plunger 162 and the second end 188 of the solenoid housing 152. The ball 166 may be movable within the solenoid housing bore 190 by way of a linkage 165 with the plunger 162.

The lock nut 168 may have a lock nut first end 202, a lock nut second end 204, and a lock nut bore 206 extending between the lock nut first end 202 and the lock nut second end 204 creating a lock nut inner wall 208. The lock nut 168 may also have a mechanism for attaching the lock nut inner wall 208, proximate to the lock nut first end 202, to the outer wall 184 of the solenoid housing 152, proximate to the second end 188 of the solenoid housing 152, such that the lock nut 168 is adjustable along the outer wall 184 of the solenoid housing 152. In one embodiment, the mechanism can be threads.

The seal member 170 may have a first end 212, a seal groove 214 in the first end 212, a second end 216, and a seal member bore 218 through the first end 212 and the second end 216 generally aligned longitudinally with the lock nut bore 206 and the solenoid housing bore 190. The first end 212 of the seal member 170 may be adjacent to the lock nut second end 204 of the lock nut 168. Additionally, there may be a seal 172 located in the seal groove 214 of the seal member 170.

The ball seat member 174 may have a seat surface end 222, an outer wall 224, a distal end 226, and a ball seat member bore 228 through the seat surface end 222 and the distal end 226. The ball seat member 174 may be positioned within the solenoid housing bore 190 such that the seat surface end 222 faces the ball 166. Further, there may be at least one of a ball seat member filter 176 positioned within the ball seat member bore 228 proximate to the distal end 226 of the ball seat member 174. The ball seat member 174 may be removable through the second end 188 of the solenoid housing 152.

The electromagnetic solenoid coil 164 acts on the plunger 162 and the plunger 162 acts on the ball 166 within the solenoid housing bore 190 such that the ball 166 contacts the seat surface end 222 of the ball seat member 174 to form a seal.

In one embodiment, the plunger 162 in the solenoid housing bore 190 may be spring biased in the closed position with spring 160, affecting the ball 166 such that the ball 166 contacts the seat surface end 222 of the ball seat member 174 creating a seal between the ball 166 and the seat surface end 222 of the ball seat member 174. When signaled, the electromagnetic solenoid coil 164 may generate an electromagnetic force to move the plunger 162 within the solenoid housing bore 190 affecting the ball 166 away from the seat surface end 222 of the ball seat member 174. Moving the ball 166 away from the seat surface end 222 allows fluid to flow through the solenoid housing bore 190 or to various ports 194, such as port 194a and port 194b in FIG. 6, for example.

In one embodiment, the plunger 162 is comprised of several components acted upon by the spring 160 and the electromagnetic force of the electromagnetic solenoid coil 164. Additionally, the solenoid housing 152 may consist of one or multiple housing components.

In one embodiment of the present disclosure, the ball seat member 174 may be designed so as to be attached to the solenoid housing 152 with the lock nut 168 through the lock nut bore 206 and through the seal member bore 218. With this attachment method the ball seat member 174 may be disassembled from the solenoid housing 152 by disengaging and removing the lock nut 168, the seal member 170, and the ball seat member 174.

The ball seat member 174 may then be repaired or replaced with an undamaged ball seat member 174. Also, the single seal 172 located on the seal member 170 may be replaced. Re-assembly of the solenoid valve assembly 150 is comprised of reattachment of the lock nut 168 with the seal member 170, seal 172, and ball seat member 174 to the solenoid housing 152.

Figure 6:
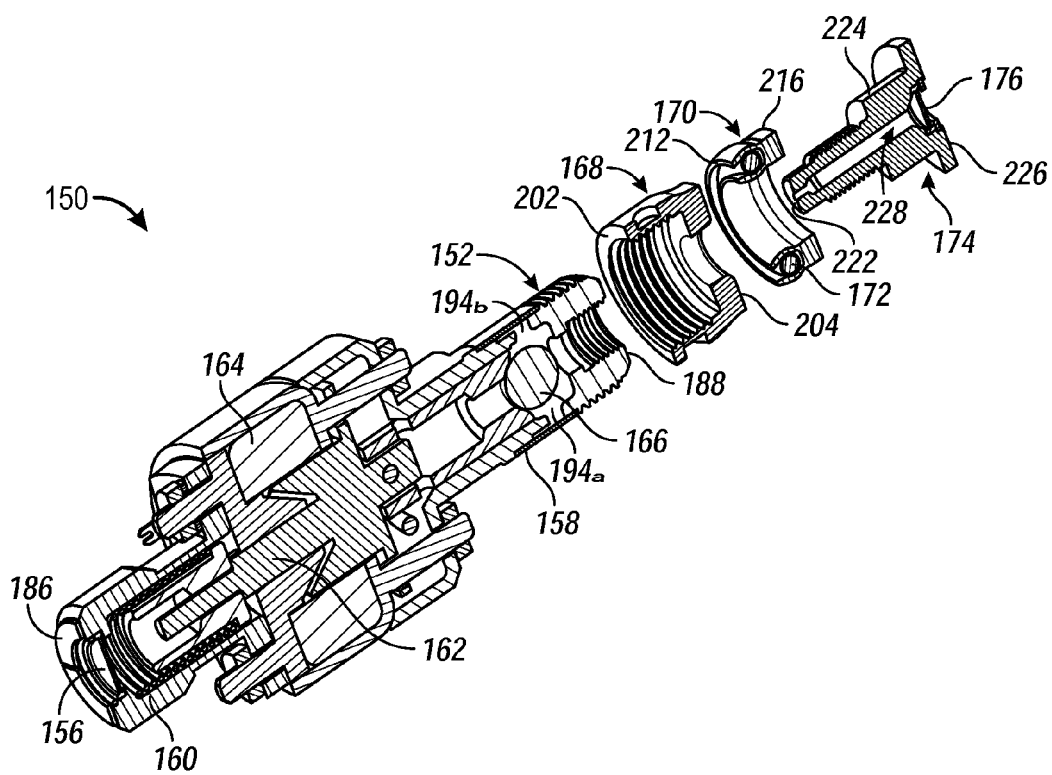
FIG. 6 is an exploded view of an exemplary solenoid valve in accordance with one or more embodiments of the present disclosure.

In one embodiment, the ball seat member 174 is provided with one or more ball seat member filters 176 filtering fluid entering the ball seat member bore 228. Additionally, one or more first end filters 156 are provided for the solenoid housing bore 190. Further, one or more port filters 158 are provided for the one or more ports 194, for example port 194a and port 194b as illustrated in FIG. 6, near the ball 166. The ball seat member filter(s) 176, first end filter(s) 156, and port filter(s) 158, assist in protecting the seat surface end 222 of the ball seat member 174 from debris that may damage the seat surface end 222. Damage to the seat surface end 222 of the ball seat member 174 may cause leakage and eventual failure of the solenoid valve assembly 150. The ball seat member filter(s) 176, first end filter(s) 156, and port filter(s) 158 may be held in place by retaining rings, or any retaining mechanism as is well known in the art.

FIG. 6 is an exploded view of one embodiment of the lock nut 168, seal member 170, and ball seat member 174 from the solenoid valve assembly 150. It should be recognized that the lock nut 168, seal member 170 and ball seat member 174 may be separate components or may be combined in part or in whole combination as a single component.

In the embodiment illustrated in FIG. 6, the lock nut 168 is a cylindrical member attachable to and removable from the solenoid housing 152 of the solenoid valve assembly 150. The mechanism for attachment between the lock nut 168 and the solenoid housing 152 may be comprised of threads, retaining rings, locking mechanisms, or other attachment mechanisms that are well known in the art. Further, the ball seat member 174 is illustrated as a cylindrical member with a mechanism for attachment of the outer wall 224 of the ball seat member 174 to the inner wall 195 of the solenoid housing 152. The mechanism of attachment between the outer wall 224 of the ball seat member 174 and the inner wall 192 of the solenoid housing 152 may be comprised of threads, retaining rings, locking mechanisms, or other attachment mechanisms that are well known in the art.

The adjustable attachment mechanisms of the lock nut 168 and the ball seat member 174 to the solenoid housing 152 allows adjustment of the space between the ball 166 and the ball seat member 174 such that larger tolerances may be used in machining the components of the solenoid valve assembly 150. This allows the solenoid valve assembly 150 components and features to be machined with less precision than in prior art, where, as illustrated in FIG. 4, the metal seat 110 component was assembled completely internally to the housing of the solenoid valve 100 assembly. Larger tolerances are advantageous as a reduction in manufacturing cost and as an aid to easier assembly.

In one embodiment, at assembly, or reassembly, of the solenoid valve assembly 150, the ball seat member 174 and the ball 166 are pressed together to deform the seat surface end 222 of the ball seat member 174 with the surface of the ball 166. This creates a seal fit between the ball 166 and the seat surface end 222 of the ball seat member 174. In one embodiment, the material used for the seat surface end 222 of the ball seat member 174 may be a material that deforms sufficiently to create a seal fit between the ball 166 and the seat surface end 222 of the ball seat member 174, but that resists further deformation. In a specific embodiment, this material may be a nickel based corrosion resistant alloy.

FIG. 7 illustrates one embodiment of the solenoid valve assembly 150 in which the solenoid valve assembly 150 is shown mounted to a downhole well tool housing. The solenoid valve assembly 150 may be provided with a ground spring 154 which is positioned around at least part of the outside of the outer wall 184 of the solenoid housing 152 and on the inside of the well tool housing that receives the solenoid valve assembly 150. The ground spring 154 provides electrical grounding between the solenoid valve assembly 150 and the well tool housing. This is a contrast to prior art which used a grounding wire for electrical grounding, which required the use of an additional cavity on the well tool housing as well as a wire cap that also required a seal, as discussed previously. The use of the ground spring 154 eliminates the need for the grounding wire, the cavity for the grounding wire, the wire cap, and the wire cap seal, along with the possibility of leakage around the wire cap seal. Additionally, the use of the ground spring 154 provides additional tolerance in the location of the solenoid valve assembly 150, versus a fixed length grounding wire. The ground spring 154 also centers the solenoid valve assembly 150.

CONCLUSION

Conventionally, solenoid valve assemblies used in downhole well tools in high temperature and high pressure environments have been subject to failure from misassembly and/or damage by debris. In accordance with the present disclosure, an apparatus and a method are disclosed that overcome these problems. The apparatus and method involve a solenoid valve assembly that is protected from debris, is more easily disassembled and reassembled, has an adjustable fit between the ball and seat, and that has fewer seals, thus reducing the opportunity for misassembly or damage.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. Apparatus for use in operating a downhole well tool comprising:
    a solenoid housing having an outer wall, a first end, a second end, and a solenoid housing bore, the solenoid housing bore being generally longitudinal extending along an axis through the first end and the second end, wherein the solenoid housing bore creates an inner wall of the solenoid housing, the solenoid housing further having at least one port connecting to the solenoid housing bore through the solenoid housing;
    at least one plunger disposed in the solenoid housing bore;
    an electromagnetic solenoid coil disposed at least in part around the plunger;
    a ball disposed in the solenoid housing bore between the plunger and the second end, the ball movable within the solenoid housing bore by way of a linkage with the plunger;
    a ball seat member having a seat surface end, an outer wall, a distal end, and a ball seat member bore through the seat surface end and the distal end, the ball seat member being positioned within the solenoid housing bore such that the seat surface end faces the ball, the ball seat member further being removable through the second end of the solenoid housing;
    at least one ball seat member filter positioned within the ball seat member bore proximate to the ball seat member distal end;
    a lock nut having a lock nut first end, a lock nut second end, a lock nut bore extending between the lock nut first end and the lock nut second end creating a lock nut inner wall, and threads on the lock nut inner wall for coupling to the outer wall of the solenoid housing proximate the second end; and
    a seal member having a seal member first end, a seal groove in the seal member first end, a seal member second end, and a seal member bore through the seal member first end and the seal member second end generally aligned longitudinally with the lock nut bore and the solenoid housing bore, wherein the seal member first end is adjacent to the lock nut second end.

2. The apparatus of claim 1, further comprising a ground spring disposed around the outer wall of the solenoid housing wherein the ground spring is in contact with the outer wall of the solenoid housing.

3. The apparatus of claim 1, further comprising at least one first end filter disposed in the solenoid housing bore proximate to the first end of the solenoid housing.

4. The apparatus of claim 3 wherein the first end filter is held in place with a retaining ring.

5. The apparatus of claim 1, further comprising at least one port filter disposed proximate to the port.

6. The apparatus of claim 1, wherein the ball seat member filter is held in place with a retaining ring.

7. The apparatus of claim 1, further comprising a spring disposed in the solenoid housing bore between the first end and the second end of the solenoid housing, the spring biasing the plunger towards the ball seat member.

8. The apparatus of claim 7, wherein the at least one plunger disposed in the solenoid housing bore is positioned between the spring and the second end of the solenoid housing.

9. The apparatus of claim 8 wherein the spring acts on the at least one plunger and the at least one plunger acts on the ball such that the ball contacts the seat surface end of the ball seat member to form a seal.

10. The apparatus of claim 1, wherein the electromagnetic solenoid coil acts on the plunger and the plunger acts on the ball within the solenoid housing bore such that the ball does not contact the seat surface end of the ball seat member.

11. The apparatus of claim 1, further comprising a seal located in the seal groove of the seal member.

12. The apparatus of claim 1 wherein the ball seat member is positioned through the seal member bore and the lock nut bore.

13. The apparatus of claim 1 wherein the solenoid housing is comprised of at least two sections.

14. The apparatus of claim 1 wherein the seat member end of the ball seat is formed of a material that is deformable to create a seal fit between the ball and the seat member end but that resists further deformation.

15. The apparatus of claim 14 wherein the material is a nickel based corrosion resistant alloy.

* * * * *